(142.)

2 Sheets--Sheet 1.

William H. Brothers' Spinning Jack.

No. 4,688.

Reissued Jan. 2, 1872.

Witnesses.
S. N. Asher.
L. N. Moller.

Wm. H. Brothers.
by his attorney.
N. Wedderburn

...M. PHOTO-LITHOGRAPHIC CO. N.Y. - OSBORNE'S ...

(142.)

2 Sheets--Sheet 2.

William H. Brothers' Spinning Jack.

No. 4,688.

Reissued Jan. 2, 1872.

Witnesses.
S. N. Piper
L. N. Möller

Wm. H. Brothers
by his attorney
R. H. Eddy

AM. PHOTO-LITHOGRAPHING CO. N.Y. (OSBORNE'S PROCESS.)

UNITED STATES PATENT OFFICE.

WILLIAM H. BROTHERS, OF HARTLAND, VERMONT, ASSIGNOR, BY MESNE ASSIGNMENTS, TO BENJAMIN S. GRANT, OF BOSTON, MASS.

IMPROVEMENT IN SELF-ACTING JACKS FOR SPINNING.

Specification forming part of Letters Patent No. 94,278, dated August 31, 1869; reissue No. 4,688, dated January 2, 1871.

*To all persons to whom these presents may come:*

Be it known that I, WILLIAM H. BROTHERS, late of Winooski, in the county of Chittenden and State of Vermont, have made a new and useful invention having reference to the machine used for spinning, and commonly called a Jack; and do hereby declare the same to be fully described in the following specification and represented in the accompanying drawing, of which—

Figure 1:
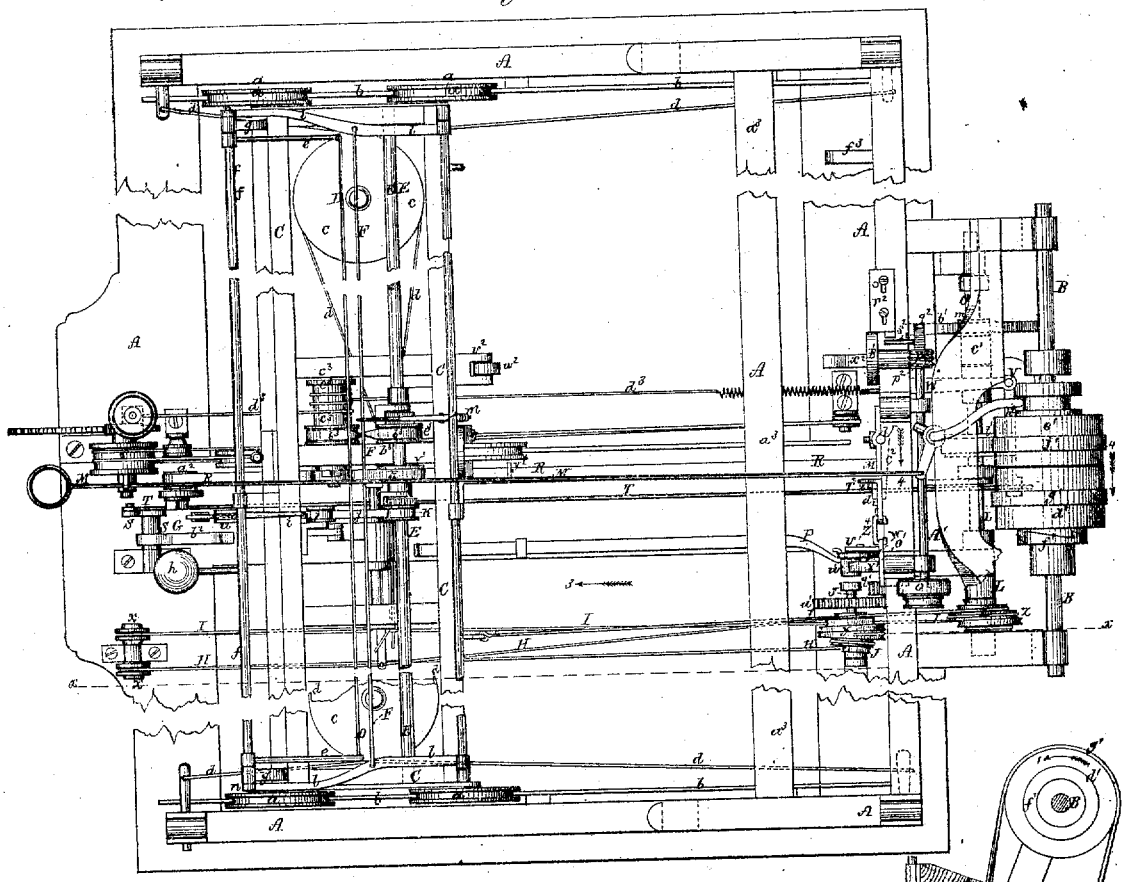
Figure 2:
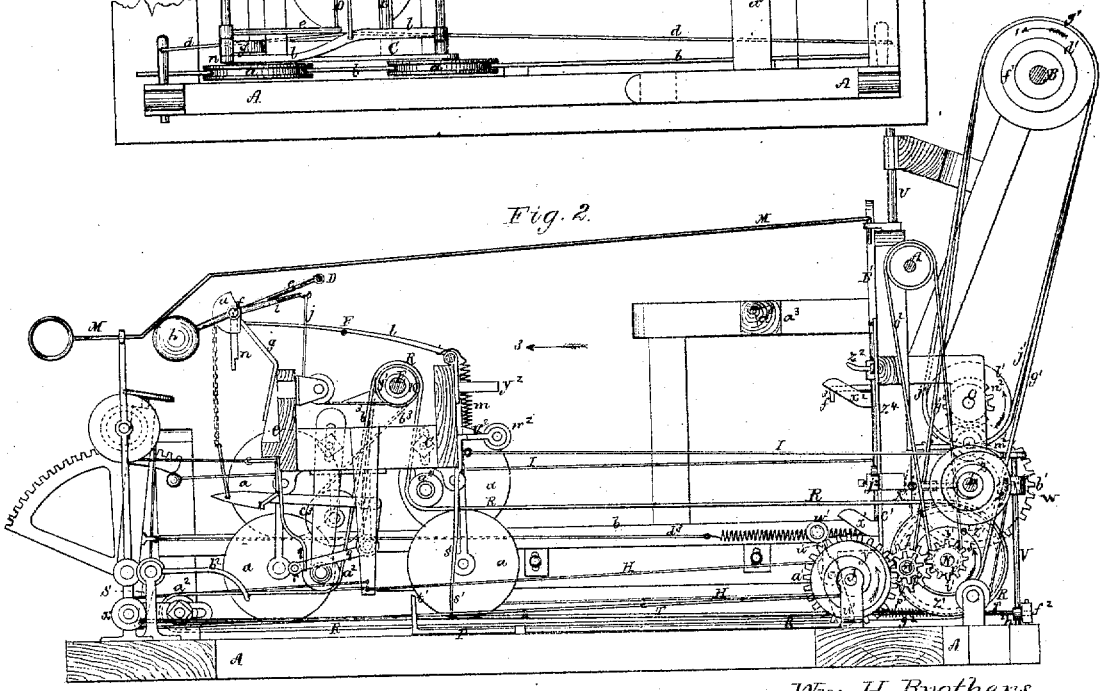
Figure 3:
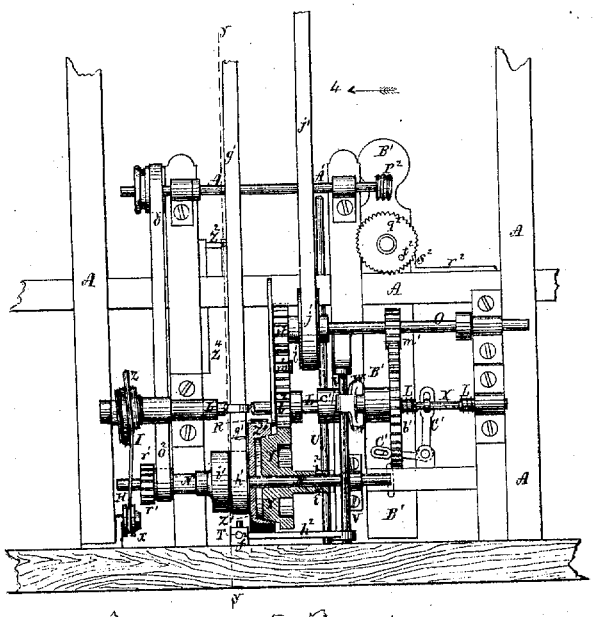
Figure 4:
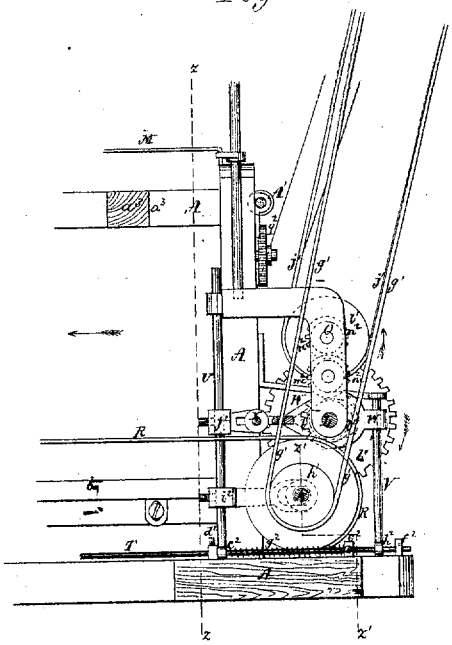
Figure 5:
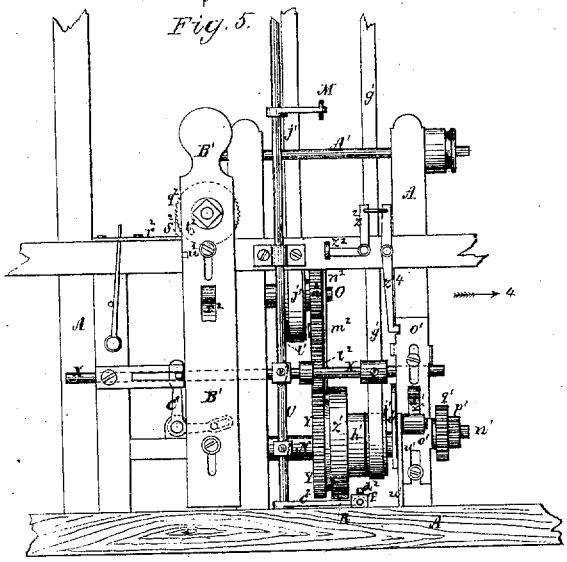

Figure 1 represents a plan or top view of a jack provided with my invention. Fig. 2 is a vertical section of the same, the plane of section being taken on the line *x x* of Fig. 1. Fig. 3 is a rear elevation in part, some portions of the mechanism being exhibited in section, the line of section being shown at *z' z'* in Fig. 4. Fig. 4 is a vertical section taken on the line *y y*, Fig. 3. Fig. 5 is another vertical section taken on the line *z z*, Fig. 4.

In these several figures like letters of reference indicate the same parts.

The object of the invention is to render the jack automatic in its operations.

I have combined with the jack, or its principal characteristics, peculiar mechanisms for the following purposes: For stopping the rearward motion of the carriage in order that it may stand still long enough for the yarns to receive the proper amount of twist; for effecting the forward movement of the carriage; for causing, during the advance of the carriage, the rotary motions of the spindles necessary to effect the winding of the yarns on the bobbins of such spindles.

In the drawing A denotes the frame of my improved or new spinning-machine. B is a driving-shaft, employed for transmitting motion to the machine, the rotary motion of such shaft being imparted to it from a suitable prime motor. C is the carriage, whose wheels *a a* rest on guide-rails *b b*, arranged, in the ordinary manner on or making part of the frame A. The said carriage is to be of the usual construction and to have the spindles applied to it in the ordinary manner, and is to be provided with the usual squaring-bands *d d* and the grooved wheels *c* for such bands to run on. The faller is shown at D, it being pivoted or applied in the usual manner to the carriage. The arms *e e* of the faller are shown as projecting from a shaft, *f*, whose journals are supported by legs or standards *g* projecting from the carriage. A weight, *h*, fixed on an arm projecting rearward from the shaft *f*, serves to overbalance the faller and hold it in its highest position when it is not required to be in action. F is the "stripper-wire," as ordinarily employed in the jack, it being secured to arms *l l* that are pivoted to the carriage. These arms project backward beyond the wire F to be caught by arms *n* projecting from the faller.

The mechanism for effecting the movements of the carriage may be thus described: The carriage C is, by means of two scroll-bands, H H and I I, connected with the driving mechanism. One end of each of the said bands is fastened to the carriage, the bands being carried around grooved wheels *x x*, arranged at the rear of the frame A, or in standards erected on the floor. These bands are also applied and fastened to scroll-pulleys *y z*, arranged as shown. The bands H H, going about the scroll-pulley *y*, serve to effect the retreat of the carriage, the bands I I going about the scroll-pulley *z* serving to produce its advance or its movement toward the roving-spools. The pulley *y* is mounted on a shaft, J, provided with a gear, $a^1$. The pulley *z* is fixed on a horizontal shaft, L, which carries and is driven by a toothed wheel, $b^1$, that will be thrown into engagement with the clutch $c^1$ when the shaft L is set in motion. The main driving-shaft carries a loose drum, composed of pulleys $d^1$ $e^1$, which, by means of a hand-shipper, M, may be moved endwise on the shaft B, so as to effect the engagement of the drum with or its disengagement from the shaft through the means of a clutch, $f^1$, one portion of which is fixed to the shaft and the other to the drum. When the drum is in engagement with the shaft B it will be revolved by it, and will thereby be caused to impart motion to the endless belts $g^1$ $j^1$ going around them. The belt $g^1$ passes over one of two pulleys, $h^1$ $i^1$, arranged on a horizontal shaft, N, which is arranged, as shown, in the lower part of the frame A, the pulley $h^1$ being fixed on the said shaft N, and the pulley $i^1$ being so applied to the shaft as to turn freely upon it. The belt $j^1$ is fitted over a pulley which is mounted on a horizontal shaft, O, arranged, as shown, in the frame A. A pinion, $m^1$, fixed on the shaft O, is constantly in gear with the loose toothed wheel $b^1$, and when in movement revolves the same, so as to impart rotary motion to it and its shaft L, provided such shaft, by means of the clutch $c^1$, be engaged with the wheel $b^1$. The shaft B, being turned in the direction of the arrow 1, will revolve the shaft O in the same direction, and will also revolve the shaft L, so as to cause the scroll-pulley $z$ to be turned in the direction indicated by the arrow 2, the carriage being advanced toward the spools while the scroll-pulley is so moved. When the belt $g^1$ is on the fast pulley $h^1$ the shaft N will be revolved in the direction of the arrow 5 and will impart motion in the same direction to the shaft J, which, through intermediate gearing, as hereinafter described, will revolve the scroll-pulley $y$, in order to cause the carriage to retreat or move backward to draw out the rovings. A short arbor, $n^1$, has its bearings in a slide-plate, $o^1$, shown particularly in Fig. 5, said plate being disposed on the rear side of that part of the frame in which the various shafts B J L N O, hereinbefore referred to, are arranged. The arbor $n^1$ carries two pinions, $p^1$ $q^1$, that gear respectively with toothed wheels $a^1$ $r^1$, the latter of which is fixed on the shaft N. (See Figs. 2 and 3.) The wheel $a^1$, as before mentioned, is fixed on the shaft J of the scroll-pulley $y$. When the plate $o^1$ is lowered into the position as shown in Fig. 2, it will cause the gears $a^1$ and $r^1$ to be engaged through the intervention of the gears $p^1$ $q^1$, whereby, whenever the belt $g^1$ is on the fast pulley $h^1$, motion will be transmitted from the shaft N to the scroll-pulley $y$, which, being thus revolved, will cause the carriage to retreat or be moved in the direction of the arrow 3. (See Fig. 2.) The said movement of the carriage will be arrested whenever the stop $s^1$ projecting down from the carriage, as shown in Fig. 2, is carried into contact with a lug, $t^1$, so as to move a slide-bar, P, from which such lug projects. The said bar P at its front end is pivoted to the lower arm of a lever, $u^1$, whose fulcrum is supported by a stationary arm, $v^1$. At its upper end the lever carries a friction-roller, $w^1$, extended underneath a lug, $x^1$, projecting from the slide-plate $o^1$. When, during the retreat of the carriage, the stop $s^1$ is carried against the lug $t^1$ and thereby moves the bar P rearward, the lever $u^1$ will be moved into a vertical position, thereby carrying its roller under and against the cam or lug $x^1$, and, as a consequence, elevating it and the plate $o^1$, so as to raise the wheels $p^1$ $q^1$ out of engagement with the gears $a^1$ $r^1$, which taking place, the rotary motion of the scroll-pulley $y$ will be arrested thereby, causing stoppage of the carriage. The carriage after this has to remain stationary a sufficient period to allow of the requisite twisting of the yarns, which is carried on by means of an endless belt, R, which passes around a pulley, $z^1$, fixed on the shaft N, and thence around a guide-pulley, $a^2$; thence around a pulley, $y^1$, fixed on the shaft E of the carriage; thence around other guide-rollers, $a^2$ $a^2$, and forward to the wheel $z^1$, all being as shown in Fig. 2.

During the retreat of the carriage, and just before the termination thereof, a roller, $r$, at the end of an arm, $q$, carried by the carriage, meets and rolls upon a curved arm, $b^2$, of a bell-crank, S, pivoted to the rear part of the frame A or to the floor. A rod, T, pivoted to the wrist of such crank, extends forward through an arm, $c^2$, projecting from a vertical shaft, U, arranged as shown in Figs. 1 and 4. On the rod T are three shoulders or fixed collars, $d^2$ $e^2$ $f^2$, arranged as shown in Figs. 2 and 4, a helical spring, $g^2$, being on the rod, and resting against the arm $c^2$ and the shoulder $e^2$, as shown, the spring tending to push the arm backward. The rod T, when next the shoulder $f^2$, goes through an arm, $h^2$, projecting from a vertical rock-shaft, V, arranged as shown in Figs. 1, 2, 3, and 4. This vertical rock-shaft V carries or rather is connected with the clutch-lever W, by which the loose wheel $b^1$ is thrown into or out of engagement with the clutch-shaft. Two other arms, $i^2$ $j^2$, extend from the rock-shaft U. The upper one, $j^2$, straddles a horizontal slide-rod, X, while the lower one, $i^2$, is connected with a toothed wheel, Y, that is arranged on and so as to slide upon the shaft N. (See Fig. 3.) Whenever the roller $r$ of the carriage meets and rolls upon the arm $b^2$ of the bell-crank S, the rod T will be retracted, thereby causing, by means of the spring $g^2$, the shaft U to be turned, so as to carry the slide-rod X and the wheel Y toward the scroll-pulley $z$. The slide-rod X has a slot, through which the belt $g^1$ runs. Whenever, by the aforesaid action of the rod T, the slide-rod X is moved in the direction of the arrow 4, (see Fig. 5,) it will carry the belt $g^1$ from the fast pulley $h^1$ to the loose pulley $i^1$, in consequence of which the shaft N will cease to be revolved by such belt. At the same time the conic frustum of the wheel Y will be moved up into the conical space in the adjacent wheel $z^1$, fixed on the shaft N, the two constituting a friction-clutch. The wheel Y will also be thrown into engagement with a loose pinion, $l^2$, on the shaft L. The pinion $l^2$, by an intermediate gear, $m^2$, engages with a pinion, $n^2$, fixed on the shaft O. The wheel Y is thus thrown into gear with the shaft O, which is constantly revolved by the belt $j^1$, and imparts the regular motion in the direction of the arrow 5 to the shaft N, the said motion being only much slower than that imparted to the shaft by the belt $g^1$. The hollow friction-wheel $z^1$ drives the endless belt R, which imparts motion to the shaft E, as before described, such movement of the belt R by the wheel $z^1$ being for reversing the motion of the shaft E, in order to effect what is termed the "backing off" of the yarn on the spindles. During all the period that the carriage is retracted and stationary the wheel $b^1$ is unclutched from its shaft L of the scroll-pulley $z$. When the slide plate $o^1$ was elevated, as aforesaid, it, to insure the stationary position of the scroll-pulley $y$, was automatically locked in its position by a swinging hook, $z^4$, pivoted to the frame A, such hook at the time entering a notch of such plate. (See Fig. 5.)

In recapitulation, it may be stated that the shaft N, when driven by the belt $g^1$, caused the carriage to retreat and the belt R to be turned; but as soon as the carriage reached its rearmost position the motion of the shaft N was taken by the shaft O so as to become slower, the carriage being stopped a sufficient period for the necessary twisting of the yarns to be produced. The belt $g^1$ was slipped upon the loose pulley, but still the shaft N continued to revolve by being connected by the clutch Y $z^1$ and intermediate gears, as described, with the shaft O, the latter shaft not being in gear with the shaft L during the retreat and stoppage or interval of rest of the carriage. By means of the belt $o^2$ (see Figs. 1, 2, and 3) and pulleys on the shafts N and $A^1$, the latter will be revolved, such shaft $A^1$ being situated as represented. It has fixed to it a worm, $p^2$, to engage at certain times with a worm-gear, $q^2$, supported on an arbor projecting from the slide-plate $B^1$. (See Figs. 3 and 5.) When the plate $B^1$ is elevated it will be locked by a sliding spring-catch, $r^2$, (see Figs. 1 and 5,) which then takes into a notch, $u^2$, of the plate $B^1$, and has a projecting arm, $s^2$, as shown. From the wheel $q^2$ a finger or stud, $t^2$, projects, as shown, it, during each revolution of the wheel, being carried into contact with the arm $s^2$, so as to push the catch $r^2$ out of the notch $u^2$ in order to allow the plate $B^1$ to fall. By means of lever $C^1$ (see Figs. 3 and 5,) the slide-bar $B^1$ is connected with the shipper-rod X in such manner that the latter will be moved in the direction of the arrow 4 (see Fig. 5) while the plate $B^1$ is being lowered, and it will be moved in the opposite direction while the said plate is in the act of being elevated. While the carriage C is retreating and at rest, as aforesaid, the plate $B^1$ is held elevated by the catch $r^2$, and the shaft $A^1$ is therefore in engagement with the wheel $q^2$. As soon as the finger $t^2$ of the wheel $q^2$ strikes the arm $s^2$ of the catch the plate $B^1$ will be released and will descend by its own weight, and thereby cause the shaft or rod X to be moved in the direction of the arrow 4. By this further motion of the bar X the clutch-lever W will be so moved as to carry the pinion $b^1$ into engagement with the clutch $c^1$ and the pinion $m^1$ of the shaft O. The scroll-pulley $z$ will then be operated by the revolution of its shaft L so as to effect the advance of the carriage. When the roller $r$ of the carriage C leaves the arm $b^2$ the spring $g^2$ will be free to act to draw the rod T forward, and will do so, and at the same time will cause the friction-wheel Y to be moved out of contact with its fellow wheel $z^1$, thus leaving the carriage free for its further advance toward the roving-rollers. On nearly reaching the terminus of its advance a friction-roller, $w^2$, supported by a projection, $v^2$, from the carriage, will be pressed under and against the inclined arm $x^2$ projecting from the plate $B^1$, and will thereby move the slide $B^1$ so as to cause the rod X to be moved back, whereby the shaft L will be unclutched from the wheel $b^1$, and the belt $g^1$ will be thrown or moved upon the fast pulley $h^1$. At the same time another lug, $y^2$, from the carriage, by acting against an arm, $z^2$, projecting from the hook $z^4$, throws such hook out of the notch in the plate $o^1$ and allows the latter to drop. Thus, by unclutching the wheel $b^1$ from the rod or shaft X, the scroll-pulley $z$ will be arrested in its motion and the advance of the carriage will accordingly be arrested, while at the same time, by the belt $g^1$ being moved upon the fast pulley and the plate $o^1$ being dropped, the scroll-pulley $y$ will be thrown into action so as to cause the carriage to retreat for the purpose of drawing out the yarns. As the plate $B^1$ is elevated its wheel $q^2$ will be moved into engagement with the worm $p^2$. When the wheel $q^2$ may have turned sufficiently, its pin $t^2$, by being moved against the part $s^2$ of the slide $r^2$, will operate such slide so as to force it out of the notch $u^2$, thereby setting free the slide-plate $B^1$, which will then drop. The carriage is thus moved automatically. After the "backing-off" operation has taken place, and before the spindles commence to wind up the yarns, the faller D should be lowered, which is effected by the winding of the strap $j$ upon the loose pulley K. The weight $h$, while the strap is being unwound from the said pulley, will gradually raise the faller and restore it to its normal position. As the carriage may approach the termination of its advance the arms $l$ $l$ of the counter-faller will pass under and against a cross-bar, $a^3$, of the frame, whereby the said counter-faller wire will be depressed and the arms $l$ $l$ will be engaged with the arms $n$ $n$ of the rod $f$. While the counter-faller by such arms is held depressed, so as to be out of the way, the faller, for the same reason, will be held up until drawn down by the strap $j$. The shaft E carries a pulley, $e^3$, (see Fig. 1,) about which and a pulley, $c^3$, (see Figs. 1 and 2,) a crossed band, $b^3$, is arranged. The band $d^3$ winds about a barrel of the said pulley $c^3$, and at one end is fastened to a spring, as shown in Fig. 1, the other end of the band being secured to the nut of the quadrant-screw at the rear part of the frame. The pulley $e^3$ runs loosely on the shaft E, and such shaft and pulley have a ratchet and pawl, by which the pulley, when moved one way, turns the shaft, but revolves freely on it while being moved in the opposite direction. The shaft E by such means is revolved while the carriage is "running-in" or advancing; the object of so revolving the shaft being to effect the winding of the yarns on the bobbins. Stops, as shown at $f^3$ in Fig. 1, are to be arranged in the frame to arrest the advance of the carriage, so as to prevent it from contact with the driving machinery.

*Claims.*

I claim, in combination with the jack or its carriage, mechanism, substantially as described, for effecting the movements and intervals of rest of the carriage, as explained, such mechanism consisting of the scroll-pulleys $y$ $z$, the bands H I, shaft J, gear $a^1$, shaft L, gear $b^1$, clutch $c^1$, the shaft N, the pulleys $h^1$ $i^1$, belt $j^1$, shaft O, pinion $m^1$, arbor $n^1$, slide-plate $o^1$, pinions $p^1$ $q^1$ $r^1$, stop $s^1$, lug $t^1$, slide-bar P, lever $u^1$, arm $v^1$, friction-roller $w^1$, lug $x^1$, roller $r$, arm $q$, curved arm $b^2$, crank S, rod T, arm $c^2$, shaft U, collars $d^2$ $e^2$ $f^2$, spring $g^2$, arm $h^2$, rock-shaft V, clutch-lever W, arms $i^2$ $j^2$, slide-rod X, gear Y, wheel $z^1$, pinion $l^2$, gear $m^2$, pinion $n^2$, hook $z^4$, worm $p^2$, wheel $q^2$, slide-plate B$^1$, spring-catch $r^2$, arm $s^2$, stud $t^2$, lever C$^1$, shaft A$^1$, roller $w^2$, arm $x^2$, lug $y^2$, and arm $z^2$, all being arranged and applied together as explained.

I also claim, in combination with the jack or its carriage, mechanism, substantially as described, for revolving the spindle-driving drum-shaft E in order to operate the spindles in a manner necessary to wind the yarn on the bobbins, such mechanism being the pulleys $e^3$ and $c^3$, band $d^3$ and crossing-band $b^3$, the pulley $e^3$ being provided with a ratchet and pawl for clutching it to the shaft, all as explained.

And I further claim, the slide-plate $o^1$, carrying the intermediate gearing for the backward-moving-scroll $y$, as set forth, when combined with the slide P and a detaining device, as described, so that the slide and its gear may be elevated and the latter held out of gear when the forward motion of the carriage is completed.

Also, the hook $z^4$ for holding the slide-plate $o^1$ elevated, when arranged so that it will automatically drop into a notch of the slide plate when the same is elevated, while it will be thrown out of the notch by a stop on the carriage to lower the plate $o^1$, substantially as herein shown and described.

Also, the slide-bar T, when provided with the shoulders $d^2$, $e^2$, and $f^2$, and with the spring $g^2$, as described, so as to actuate the rocking shippers U and V, substantially as herein shown and described.

Also, the shipper-lever W, when connected both with the rock-shaft V and with the slide-bar X, and operating the loose wheel $b^1$ and clutch $c^1$, substantially as herein shown and described.

Also, the slide plate B$^1$, when connected by a bell-crank, $c^1$, with the sliding shipper-bar $x$, and operating the belt $g^1$, the loose wheel $b^1$, and the toothed clutch-wheel Y by its motion, substantially as herein shown and described.

Also, the hollow cone $z^1$, arranged on the shaft N, in combination with the loose toothed clutch-wheel Y and intermediate gearing, substantially as described, to operate the shaft N from the shaft O for the purpose of reversing the motion of the spindles and performing the operation known as "backing off."

Also, the rock-shaft U, carrying the arms $c^2$, $i^2$, and $j^2$, substantially as described, so as to receive motion from the slide-bar T and to impart it to the shaft V and bar X, substantially as herein shown and described.

Also, the carriage C, when provided with the stops or projections $q$ $r$ $s^1$ $y^2$ and $v^2$ $w^2$, as described, so that it will automatically set the various parts of the driving machinery to regulate its own motion, as specified.

Also, the combination of the pulley $l^1$ and shaft O, gear $m^1$, clutch-gear $b^1$, clutch $c^1$, shaft L, and scroll $z$, substantially as described, to effect the drawing in of the carriage.

WILLIAM H. BROTHERS.

Witnesses:

DANIEL L. CUSHING,
ELBRIDGE I. ABBOTT.

(142)